United States Patent

Koller et al.

[15] 3,704,573
[45] Dec. 5, 1972

[54] CLEANING APPARATUS FOR THE OPERATION OF FILTER EQUIPMENT

[72] Inventors: Hans Koller; Urs Frey-Portner, both of Muttenz, Switzerland

[73] Assignee: Buss AG, Basel, Switzerland

[22] Filed: Sept. 8, 1970

[21] Appl. No.: 70,162

[30] Foreign Application Priority Data

Sept. 9, 1969 Austria ................. A 8540/69

[52] U.S. Cl. ................. 55/268, 55/96, 55/283, 55/302, 55/341, 68/18 F, 202/200, 203/41
[51] Int. Cl. ................................................. B01d 46/04
[58] Field of Search ..210/333, 167; 55/96, 262, 302, 55/343, 341, 283; 34/74, 82; 202/200; 203/41; 159/4 C; 68/18 F

[56] References Cited

UNITED STATES PATENTS

| | | | |
|---|---|---|---|
| 2,429,751 | 10/1947 | Gohr et al. | 55/97 |
| 2,836,045 | 5/1958 | Smith | 210/167 |
| 3,053,030 | 9/1962 | Smith | 55/282 |
| 3,206,950 | 9/1965 | Xeros | 68/18 R |
| 3,208,205 | 9/1965 | Harms et al. | 55/527 |
| 3,352,763 | 11/1967 | Shields | 210/167 |
| 3,473,300 | 10/1969 | Wilm et al. | 55/343 |
| 3,535,852 | 10/1970 | Hirs | 55/527 |
| 2,237,417 | 4/1941 | Groft | 55/282 |
| 3,538,615 | 10/1970 | Fuhring | 34/74 |

*Primary Examiner*—Bernard Nozick
*Attorney*—Abraham A. Saffitz

[57] ABSTRACT

A filter equipment containing a number of filter units of conventional design, connected directly to process equipment, in which dust laden vapors are evolved under vacuum.

Means are used to back wash, dry and heat the individual filter bags during continuous operation. The backwashing, drying and heating is performed with superheated vapor having the same composition as the vapor evolved in the main process.

After condensation, part of the vapor evolved in the main process may be diverted into an evaporator, superheated in the vapor phase and then used for the backwashing, drying and heating. If lines are too long resulting in vapor near the dew point, the effect of double expansion with partial condensation may be used to bring back the vapor to the superheated phase before backwashing a filter bag.

1 Claim, 1 Drawing Figure

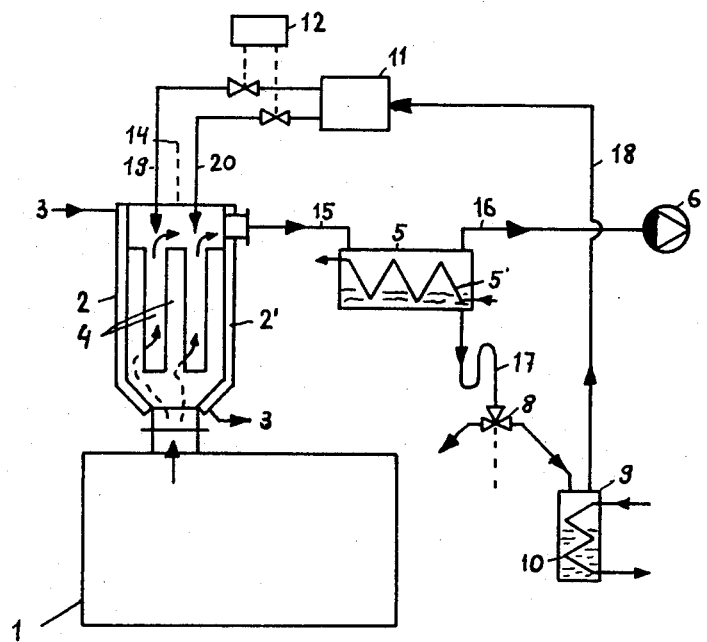

CLEANING APPARATUS FOR THE OPERATION OF FILTER EQUIPMENT

BACKGROUND OF THE INVENTION

The field of application of the present invention relates to the filtration of dust laden vapor which is evolved from thermally sensitive substances in a vacuum dryer or an extraction plant, these dust laden vapors being evolved near the point of condensation. The filter has to be cleaned during this operation and the present invention is directed to solving this problem. It further relates to reverse flow cleaning of an individual filter chamber or bag in a filter combination, in which dust ladden vapors from a vacuum dryer or an extraction plant are to be filtered and where the filter has to be cleaned during operation.

Reverse flow cleaning, the so-called "backwashing" of individual filter units, is well known and successfully applied where dust laden gas is passed through the porous wall of a chamber or a bag, while the dust is left clinging to the outer surface of the latter.

But this system has not been successfully applicable where vapors are to be filtered in a state near the point of condensation and contaminated with dust. In this case part of the vapors readily condense in the pores of membranes or bag-cloth and increase the resistance the passage of further vapor until complete blockage occurs. Often the dust combines with the prematurely condensed vapor to form a sticky mass not easily dislodgable during cleaning operations.

If this occurs during a vacuum drying operation of thermally sensitive substances, costly interruptions occur and a disadvantageously prolonged drying time results.

The present invention discloses a means to heat the individual porous membranes of filter bags in a filter unit in a periodic cycle without interruption of the main process, thus to prevent for an appreciable time premature condensation in the pores of the filter bags of the vapors which are to be filtered. At the same time the filter members are blown free of accumulated dust, any condensate being evaporated and the members dryed again. Use is made for backwashing of superheated vapor having the same composition as the vapors evolved in the main process.

This offers the advantages of no contamination, possible use of hot condensate for producing small quantities of superheated vapor for back-washing, same characteristics for condensation of both the process and the backwash vapor and practically no increase of load on the vacuum equipment because the amount of uncondensables will not be increased by this apparatus.

An arrangement of means to operate the apparatus of the present invention is diagramatically shown on the attached drawing.

It presents the arrangement preferred in conjunction with a rotary vacuum dryer.

Referring to the drawing and the numerals of reference thereon, the rotary vacuum dryer 1 operates in a manner to evaporate solvent, the vapors of which pass through a filter unit 2, equipped with outer jacket for heating, the heating medium entering at 3 and leaving at 3'.

The filter unit 2 is provided with the required number of filter bags 4, two of which are shown in the diagram. A slide 14 may be used to cyclically divide each of the filter bags from the vacuum suction, during the time when it is blown in reverse flow with superheated vapor. If the superheated vapor is blown with high pressure as a blast, the dividing slide 14 may be obviated. If the superheated vapor is blown more gently and for an appreciably longer time than required for drying and heating of the bag, then the stepwise movement of the slide to the next bag may be combined with a rapping movement to shake the just dried bag and free it of any solid still clinging to it. The exhaust line 15 for the filtered vapors leads to a condenser 5, provided with a cooling coil 5', the traces of uncondensable gas being then aspired by the vacuum pump 6 connected by line 16 to the condenser 5. The condensate is discharged through pipe 17, the condenser 5 being mounted in an elevated position to allow discharge barometrically against the vacuum. If required, the discharge can be diverted from time to time through the remotely controlled dividing valve 8 to fill the solvent evaporator 9 to a controlled level. Heat is provided by coil 10 and evaporates the solvent so that the superheated vapors escape through pipe 18 and accumulate in drum 11. In number corresponding to the number of filter bags individual lines 19 and 20 or a single line with the required number of branched outlets lead to the filter unit 2. A remote control 12 operates valves on each branch to blow in sequence each filter bag 4 and to turn the slide 14 into the next position, rapping during release the filter bag just blown.

The advantage of the disclosed apparatus in an embodiment according to the described example is a substantially shorter period of drying of thermosensitive pharmaceuticals in a rotary vacuum dryer, than required in the same equipment with the bag filter operated in the conventional manner, during which considerable increase in flow resistance through the filter bags gradually reduced the efficiency of the vacuum in the dryer.

It has been found possible to reduce the drying time by the application of the new method by 30 percent without any need for special interruption for bag cleaning after the charge had been dried.

What we claim is:

1. A filter cleaning means comprising a filter housing adapted to be connected to a dryer having filter bags therein, which filter dust from solvent laden vapors passing through said filter bags, said filter housing including means for passing dust laden solvent vapors through the filter bags in a forward flow direction, means connected to said housing for blowing vapor through said filter bags in reverse flow relation to the flow of solvent laden vapor from said dryer and through said bags, sliding means dividing said filter bags from each other and to permit the bags to be separately blown in said reverse flow, a heating coil means, in heat exchange relation with said filter housing, an exhaust line from said filter housing, a condenser connected to said exhaust line including a cooling coil to condense solvent vapors, an evaporator, valve means connected to said condenser and said evaporator said condenser being mounted above said evaporator so that the condensate is discharged barometrically against the vacuum through said valve means and means connected to said evaporator and to said means for blowing vapor for controlling the flow of superheated solvent to blow against a selected filter bag in the reverse flow direction and thereby clean the filter.

* * * * *